United States Patent
Dutoit et al.

(10) Patent No.: US 9,297,480 B2
(45) Date of Patent: Mar. 29, 2016

(54) METHOD FOR INSTALLING A SENSING CABLE ALONG A PIPELINE

(71) Applicant: Omnisens SA, Morges (CH)

(72) Inventors: Dana Dutoit, Chaska, MN (US); Carlos José dos Santos Borda, Divonne-les-Bains (FR); Marc Niklès, Attalens (CH)

(73) Assignee: OMNISENS SA, Morges (CH)

( * ) Notice: Subject to any disclaimer, the term of this patent is extended or adjusted under 35 U.S.C. 154(b) by 127 days.

(21) Appl. No.: 14/174,164

(22) Filed: Feb. 6, 2014

(65) Prior Publication Data

US 2014/0270624 A1 Sep. 18, 2014

Related U.S. Application Data

(60) Provisional application No. 61/790,856, filed on Mar. 15, 2013.

(51) Int. Cl.
| | |
|---|---|
| *G02B 6/00* | (2006.01) |
| *F16L 9/18* | (2006.01) |
| *G02B 6/50* | (2006.01) |
| *G02B 6/44* | (2006.01) |

(52) U.S. Cl.
CPC . *F16L 9/18* (2013.01); *G02B 6/504* (2013.01); *G02B 6/4465* (2013.01)

(58) Field of Classification Search
CPC .................................................. G02B 6/4465
See application file for complete search history.

(56) References Cited

U.S. PATENT DOCUMENTS

| | | | | | |
|---|---|---|---|---|---|
| 3,343,890 | A | * | 9/1967 | Homer | 175/325.2 |
| 4,565,351 | A | * | 1/1986 | Conti | H02G 1/081 138/108 |
| 7,131,790 | B1 | * | 11/2006 | Cordoves | 405/184 |
| 2001/0020675 | A1 | * | 9/2001 | Tubel et al. | 250/227.11 |

FOREIGN PATENT DOCUMENTS

DE 4205574 A1 * 2/1991 ............... H02G 1/08

* cited by examiner

*Primary Examiner* — Uyen Chau N Le
*Assistant Examiner* — Chad Smith
(74) *Attorney, Agent, or Firm* — Pearne & Gordon LLP

(57) ABSTRACT

According to the present invention there is provided a method for installing a sensing cable along a pipeline, comprising the steps of, attaching one or more conduits to an outer-surface of a pipe which is to be installed in a bore hole to form a pipeline assembly; moving the pipeline assembly into the bore hole; moving an fiber optic sensing cable into one or more of the conduit after the pipeline assembly has been moved into the bore hole or before the pipeline assembly has been moved into the bore hole. There is further provided a corresponding pipeline assembly, and a attachment head which can facilitate attachment of a pulling line to a pipeline assembly.

15 Claims, 6 Drawing Sheets

METHOD FOR INSTALLING A SENSING CABLE ALONG A PIPELINE

FIELD OF THE INVENTION

The present invention concerns a method for installing a sensing cable along a pipeline and in particular to a method for installing a sensing cable along a pipeline which is installed in a horizontal directional drilling section. There is further provided a corresponding pipeline assembly, and a attachment head which can facilitate attachment of a pulling line to a pipeline assembly.

BACKGROUND

Efficient pipeline monitoring can be achieved with the help of optical based distributed sensing method and provides long term information on the pipeline integrity As is shown in FIG. 1, usually, a fibre optic sensing cable 100 is installed in the trench 101 along the pipeline 102; once backfilled, the fibre optic sensing cable 100 lies within close vicinity of the pipeline 102.

In the configuration shown in FIG. 1, ground movement around the pipeline 102 can be measured for instance using Brillouin based (for instance BOTDA, BOTDR etc) based or Rayleigh based (for instance COTDR etc) methods. Similarly pipeline leakage can be detected and localized using distributed temperature sensing methods, for instance using Raman based or Brillouin based DTS as well as using for instance so called acoustic methods (COTDR). Third party intrusion can also be detected using for instance COTDR or interferometry based method. For DTS, the local temperature variation induced by the leak is measured and localized whilst for acoustic solution the vibration induced by the leak is measured and localized. Likewise, acoustic or interferometry solution provides information on third party intrusion. Other methods using point sensors connected by optical fibres also rely on the presence of an optical cable in the pipeline vicinity.

Often, the pipeline must cross roads, rivers, railway lines or even go below buildings. One possible approach is to use the so called Horizontal Directional Drilling method (HDD), which comprises making a small tunnel (bore hole) which is substantially horizontal to the earth surface, which is typically 1.5 times larger in diameter than the pipeline. The steps involved in a Horizontal Directional Drilling method are illustrated in FIG. 2. In this example Horizontal Directional Drilling method is performed so that a pipeline may be passed under a river 50. As shown in FIG. 2 drilling starts on one side 51 of the river 50, using a drilling rig 53 with a drill pipe 54 and drill bit 57; and a bore hole 55 is drilled and drilling is continued to reach a level which is below the river bed 56; drilling then continues horizontally under the river bed 56 before drilling towards the surface again on the opposite side 58 of the river 50.

Next a reaming of the drilled bore hole 55 is performed using a reamer 59 to provide the bore hole 55 with the desired dimension. In particular reaming is preformed to enlarge the diameter of the bore hole 55 to a desired diameter.

Once the bore hole 55 has been reamed, the pipeline 60 is pulled through the bore hole 55, from one end of the bore hole 62 to the opposite end 63 of the bore hole 55, using a pulling line 65 in a process commonly known as pipe string pullback. As shown in the figure the pulling line 65 is connected to the pipe by means of a reamer 59 and swivel 66.

It is difficult to install fibre optic sensing cables, such as those shown in FIG. 1, along pipelines which are installed in horizontal bore holes. It is necessary for the fibre optic sensing cable close to the pipe, thus inside the bore hole. However, current methods are not practical to enable this since the diameter of the bore holes are only marginally larger than the diameter of the pipeline. Thus, there is no space for a person to move inside the bore hole to install a fibre optic sensing cables along the length of the pipeline. Moreover, the bore hole is full of bentonite (fluid used to lubricate and refrigerate the drill head and reamers before and after the pull) which makes any kind of human access impossible. Furthermore due to the tight space between the pipeline and the walls of the bore hole, it is not possible, or at least very difficult, to thread a fibre optic sensing cable along the space between the pipeline and the walls of the bore hole.

A straightforward alternative is to attach the sensing cable to the pipeline, for instance on the top for convenience. However, when the pipe string pullback operation is performed, there are contact zones 105 as shown in FIG. 3, over which the pipe 106 will rub against the walls of the bore hole 108 (note that, depending on the buoyancy of the pipeline which can be positive or negative, the pipe will rub against the top or the bottom walls 109a,109b of the bore hole 108 once that the bore hole 108 is full of bentonite). If a fibre optic sensing cable is attached to the pipeline it too will rub against the walls 109a,109b of the bore hole 108. The rubbing of the fibre optic sensing cable against the walls 109a,109b of the bore hole 108 will cause damage to the fibre optic sensing cable, or may cause the fibre optic sensing cable, or parts of the fibre optic sensing cable, to become detached from the pipeline, or even broken.

Another alternative is to drill a second smaller bore hole, for the fibre optic sensing cable, adjacent to the bore hole in which the pipeline is located. However, this would increase the distance between the pipeline and fibre optic sensing cable thus reducing the sensing capacities of the fibre optic sensing cable. Moreover, an additional bore hole represents a significant additional cost to the sensing system.

It is an aim of the present invention to obviate or mitigate at least some of the above-mentioned disadvantages.

BRIEF SUMMARY OF THE INVENTION

According to a first aspect of the present invention there is provided a method for installing a sensing cable along a pipeline, comprising the steps of, attaching one or more conduits to an outer-surface of a pipe which is to be installed in a bore hole to form a pipeline assembly; moving the pipeline assembly into the bore hole; moving a fiber optic sensing cable into one or more of the conduit after the pipeline assembly has been moved into the bore hole or before the pipeline assembly has been moved into the bore hole.

It will be understood that the term attachment as used in the present application includes, but is not limited to, when the one or more conduits are held in abutment with a surface of the pipe.

Preferably the bore hole is a substantially horizontal bore hole. The bore hole may be a horizontal bore hole.

The step of moving a fiber optic sensing cable into a conduit may comprise the steps of providing a pulling line in the conduit so that it extends within the conduit, along the length of the conduit; connecting an end of the pulling line to a fiber optic sensing cable; retracting the pulling line from conduit from so that the fiber optic sensing cable is pulled through the conduit.

It will be understood that the pulling line may be directly or indirectly connected to the fiber optic sensing cable. For example the pulling line may be indirectly connected to the fiber optic sensing cable by means of an attachment head which is provided at an end of the pulling line.

The step of moving a fiber optic sensing cable into a conduit may comprise, threading the optical sensing cable through the conduit by pushing the fiber optic sensing cable from a first end of the conduit, until the fiber optic sensing cable extends within the conduit, along the length of the conduit, and an end of the sensing optical fibre reaches a second, opposite, end of the conduit.

The step of moving a fiber optic sensing cable into a conduit may comprise the step of providing an air flow and/or fluid flow within the conduit which pushes the fiber optic sensing cable along the length. The air and/or fluid may flow from the end of conduit in which the fiber optic sensing cable is inserted, towards the opposite end of the conduit. It will be understood that flow and/or fluid flow may be used to insert any longitudinal member e.g. cable or sensor, into the conduit so that the longitudinal member extends inside the conduit, along the length of the conduit. For example in the present invention a reinforcing member, such as a metallic cable, rod or rope member, may be provided in the conduit so that the reinforcing member extends inside the conduit, along the length of the conduit. The method may comprise the step of providing air flow and/or fluid flow within the conduit which pushes the reinforcing member along the length of the conduit, inside the conduit.

The step of attaching one or more conduits to an outer-surface of a pipe may comprise strapping one or more conduits to the outer-surface of the pipe using polymer straps. It will be understood that any suitable attachment means may be used, for example, tape or bands may be used to attach the one or more conduits to an outer-surface of a pipe The step of attaching one or more conduits to an outer-surface of a pipe may comprise attaching a conduit at any position between 1 o'clock-5 o'clock positions and 7 o'clock-11 o'clock positions along the circumference of the pipe.

The step of attaching one or more conduit to an outer-surface of a pipe may comprise attaching a conduit at a 10 o'clock position along the circumference of the pipe and/or attaching a conduit at a 2 o'clock position along the circumference of the pipe.

Preferably the pipe has a cylindrical configuration.

The method may comprise attaching a first and second conduit to the pipe, wherein the first conduits comprise a pulling line which extends within the conduit, along the length of the conduit, and an end of the pulling line is attached to a fiber optic sensing cable; and the second conduit comprises a second fiber optic sensing cable which extends within the second conduit, along the length of the second conduit. The step of moving the pipeline assembly into the bore hole, may be carried out when the first conduit comprises a pulling line which extends within the conduit, along the length of the conduit, and an end of the pulling line is attached to a fiber optic sensing cable; and the second conduit comprises a second fiber optic sensing cable which extends within the second conduit, along the length of the second conduit.

The method may comprise the step of providing a first fiber optic sensing cable in the first conduit, which extends within the conduit, along the length of the first conduit, and a second fiber optic sensing cable in the second conduit, which extends within the second conduit, along the length of the second conduit, before moving the pipeline assembly into the bore hole.

The method may comprise attaching a first and second conduit to the pipe, wherein the first conduit comprises a first fiber optic sensing cable which extends within the first conduit, along the length of the first conduit; and the second conduit comprises a second fiber optic sensing cable which extends within the second conduit, along the length of the second conduit. In this embodiment the fiber optic sensing cables are provided in their respective conduits before the conduits are attached to the pipe. It will be understood that alternatively, the conduits may be attached first to the pipe and thereafter the fiber optic sensing cables are provided in their respective conduits.

The method may comprise the step of providing a first fiber optic sensing cable in the first conduit, which extends within the conduit, along the length of the first conduit, and a second fiber optic sensing cable in the second conduit, which extends within the second conduit, along the length of the second conduit, before moving the pipeline assembly into the bore hole.

The method preferably comprises the step of further providing a reinforcing member in the or each conduit, so that the or each reinforcing member extends inside the conduit, along the length of its respective conduit. The method may comprises the step of providing a reinforcing member only in at least one of the one or more conduits. The reinforcing member may be a cable (referred to as a reinforcement cable), rod or rope member for example. Preferably reinforcing member is a metallic cable. The reinforcing member will help to prevent the conduit from collapsing if/where the conduit rubs, or hits against, the walls of the bore hole. Preferably the or each reinforcing member will be positioned adjacent to fiber optic sensing cable which extends inside the conduit, along the length of the conduit. The method may comprise the step of attaching the or each fiber optic sensing cable to a respective fiber optic sensing cable. Most preferably the or each fiber optic sensing cable in the each conduits is connected to a respective reinforcing member which extends inside the conduit, along the length of the conduit.

So in the embodiments of the present invention fiber optic sensing cables may be moved into each of the one or more conduits before the pipeline assembly is moved into the bore hole; or fiber optic sensing cables may be moved into some of the one or more conduits and a pulling line, one end of which connected to a fiber optic sensing cable, moved into others; or fiber optic sensing cables may be moved into some of the one or more conduits and a reinforcement cable only moved into others; or pulling lines, the end of each of which connects to a fiber optic sensing cable, may be provided in some of the one or more conduits and a reinforcement cables only moved into others. Optionally a reinforcement cable is provided in each, or some, of the conduits, in addition to the pulling line or fiber optical sensing cable, before the pipeline assembly is moved into the bore hole.

The method may further comprise the step of securing a fiber optic sensing cable to the conduit in which it extends. Preferably the method may further comprise the step of gluing a fiber optic sensing cable to the conduit in which it extends. After moving a fiber optic sensing cable into one or more of the conduits the or each fiber optic sensing cable may be glued to its respective conduit in which it extends. The or each fiber optic sensing cable may be glued to its respective conduit in which it extends, before or after the pipeline assembly is moved into the bore hole. The method may comprise the step of injecting glue into the conduit. The glue will secure the fiber optic sensing cable to the conduit in which it extends once it has hardened.

The method may comprise the step of attaching a plurality of conduits to the pipe. It will be understood that any number of conduits may be attached to the pipe. Preferably two conduits will be attached to the pipe as was discussed earlier. However in certain embodiments three or more conduits may be attached to the pipe. Preferably each of the plurality of conduits are attached to an outer-surface of the pipe. Since each conduit may be provided with a fiber optic sensing cable the pipe assembly may comprise a plurality of fiber optic sensing cables.

In the present invention at least one of the fiber optic sensing cables provided in the one or more conduits may be configured to measure bending, temperate and/or strain. Preferably, at least one of the one or more other sensing cables may be configured to measure strain in the pipe.

In the present invention the or each fiber optic sensing cable may comprise a fixed optical fiber and a loose optical fiber. The fixed optical fiber can be used to measure strain and the loose optical fiber can be used to measure temperature.

The step of moving the pipeline assembly into the bore hole may comprise pulling the pipeline assembly into the bore hole using a pulling line. A pulling line may be extended along the bore hole from a first end of the bore hole. Once it reaches the second, opposite end of the bore hole, it may be attached to the pipeline assembly (the pulling line may be directly attached to the pipeline assembly or indirectly attached to the pipeline assembly using an attachment head which is fastened to an end of the pulling line. The pulling line may then be retracted from the bore hole so that the pipeline assembly is pulled through the bore hole.

The step of attaching the pulling line to the pipeline assembly may comprise the steps of attaching the pulling line to the pipe of the pipeline assembly and to each of the one or more conduits which are attached the pipe. The step of attaching the pulling line to the pipeline assembly may further comprise the step of attaching the pulling line to fiber optic sensing cables which are in each of the one or more conduits. The pulling line may be attached directly or indirectly by means of an attachment head to the pipe, conduits and fiber optic sensing cables.

The method may further comprise the step of attaching the pipeline assembly to an attachment head which is provided at an end of a pulling line, wherein attaching the pipeline assembly to the attachment head comprises positioning a portion of each of the one or more conduits into one or more tracks which are provided on the attachment head, and securing each of the one or more conduits to the attachment head using fasteners. Each track is preferably defined by a cylindrical member.

The method may further comprise the step of attaching the pipe of the pipeline assembly to the attachment head. Preferably the attachment head comprises a cylindrical member which defines a socket which can receive a portion of the pipe. The method preferably comprises the step of positioning a portion of the pipe in the socket defined by the cylindrical member.

The step of moving the pipeline assembly into the bore hole may comprises the step of pulling the pipeline assembly through the bore hole using a pulling line, using a protective cover which are provided on the attachment head to prevent the tracks from contacting walls of the bore hole. The protective cover may also help to maintain a gap between the walls of the bore hole and the one or more conduits as the pipeline assembly is pulled through the bore hole.

According to a further aspect of the present invention there is provide an attachment head, suitable for fastening to an end of a pulling line, the attachment head comprising a socket suitable for receiving a portion of a pipe of a pipeline assembly, and one or more tracks, each of which are suitable for receiving a portion of a conduit of a pipeline assembly wherein a portion of fiber optic sensing cable is contained within the or each conduit.

The socket suitable for receiving a portion of a pipe of a pipeline assembly is preferably defined by a cylindrical member. The one or more tracks are each preferably defined by cylindrical members.

The attachment head may further comprise a mean for connecting the or each conduit to the attachment head. For example the attachment head may comprise holes, and hook members comprising hooks at opposite ends of the member, may hook into a hole provided on a conduit and a hole provided on the attachment head to connect the conduit to the attachment head. It will be understood that any other suitable attachment means may be used.

The attachment head may further comprise a cover which is arranged to extend of the one or more tracks.

The cover may further extend over the means for connecting. The cover in this case will prevent dirt from reaching the means for connecting. The cover may also provide protection for the one or more tracks and the parts of the conduits which are contained in the tracks. The cover may also serve to maintain a gap between the pipeline assembly and walls of a bore hole.

The attachment head may further comprise a member with a hole defined therein to which a pulling line can be fastened. The member may extend form the cylindrical member which defines the socket for receiving a portion of the pipe.

The attachment head may further comprise a means to connect to the fiber optic sensing cables provided in the one or more conduits.

According to a further aspect of the present invention there is provided a pipeline assembly comprising, a pipe which is suitable for occupying a horizontal drilled section; one or more conduits which is/are attached to an outer-surface of the pipe, wherein each of the one or more conduits is suitable for receiving a fiber optical sensing cable.

The one or more conduits are preferably attached to outer-surface of the pipe at any position between 1 o'clock-5 o'clock positions and/or 7 o'clock-11 o'clock positions along the circumference of the pipe.

A conduit may be attached to outer-surface of the pipe at a 10 o'clock position along the circumference of the pipe and/or at a 2 o'clock position along the circumference of the pipe.

The pipeline assembly may comprise a first conduit attached to outer-surface of the pipe at a 10 o'clock position along the circumference of the pipe and as second conduit attached to outer-surface of the pipe a 2 o'clock position along the circumference of the pipe. The pipeline assembly may further comprise a third conduit which is attached to outer-surface of the pipe. The third conduit may be attached at any position on the outer-surface of the pipe. Preferably the third conduit is attached at a 12 o'clock or 12 o'clock position along the circumference of the pipe. It follows that the method described above may comprise the steps of attaching any of these conduits to the pipe at these positions along the circumference of the pipe.

The pipeline assembly may comprise a first and second conduit, wherein the first conduit comprise a pulling line which extends within the first conduit, along the length of the first conduit, and an end of the pulling line is attached to a fiber optic sensing cable; and the second conduit comprises a second fiber optic sensing cable which extends within the second conduit, along the length of the second conduit.

The pipeline assembly may comprise a first and second conduit, wherein the first conduit comprises a first fiber optic sensing cable which extends within the first conduit, along the length of the first conduit; and the second conduit comprises a second fiber optic sensing cable which extends within the second conduit, along the length of the second conduit.

The or each conduit may comprise a polymer coating. The polymer coating on each of the one or more conduit may be the same as a polymer coating provided on the pipe in the pipeline assembly.

The or each conduit may be configured to have a laminated structure.

The or each conduit may be configured to have a laminated structure comprising a plurality polymer layers. At least one of the layers may comprise metal. Preferably the or each conduit comprises a first layer which comprises for instance a polymer layer with for instance a aramid or glass fibre of carbon fibre or alike reinforcement; a second layer which is metallic; and a third outer layer which comprises polymer. Preferably the polymer of the outer sheath is Polyethylene.

The or each conduit may each comprise a reinforcing member which extends inside the conduit, along the length of its respective conduit. The reinforcing member may be a metallic cable, rod or rope member for example. The reinforcing member will help to prevent the conduit from collapsing if/where the conduit rubs, or hits against, the walls of the bore hole. The fiber optic sensing cable(s) which have been moved into the or each conduit is attached to the metallic cable which is located inside the conduit. This attachment may be achieved by means of glue, straps or bands or any other suitable means. The reinforcing member is preferably a metallic cable. Preferably the metallic cable is a steel cable. The metallic cable may run adjacent a fiber optical sensing cable or pulling line which is located within the respective conduit. The metallic cable may also be attached to an attachment head which is provided at an end of a pulling cable. The metallic cable may be attached to the attachment head which is provided at an end of a pulling cable using hooks (as described later in the description) or any other suitable attachment means. This provides a stronger pulling force for the sensing/metallic cable assembly and reduces the risk of sensing cable breakage. Due to the rubbing force, the conduit tends to move back and doing so add strain by friction on the sensing cable inside. The provision of the metallic cable ensures that part of the load due to the conduit movement is taken by the metal cable thus reducing the strain on the sensing cable. The metallic cable therefore provides structural support which reduces the risk of the sensing cable becoming damaged. Preferably, the sensing cable is attached regularly (for instance every 2 to 5 m) to the metallic cable so that strain on the sensing cable is regularly transferred to the metallic cable. This further reduces the risk for damaging the cable. This means that straps, bands, or tape which is used to attach one or more conduits to the pipe are provided at regular intervals along the length of the pipe. For example straps, bands, or tape which hold the one or more conduits against the outer-surface of the pipe may be provided every 2-5 m along the length of the pipe.

Preferably the one or more conduits are attached to an outer-surface of the pipe using straps. The straps may comprise polymer. For example, the straps may comprise Polyethylene.

The pipeline assembly may further comprises a attachment head according to any of the above-mentioned attachment heads, wherein the attachment head receives an portion of a pipe of a pipeline assembly in its socket, and receives one or more of the conduits in its one or more tracks.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The present invention provides a mean of solving the problems associated with installation of fiber optic sensing cable along the HDD. In particular the present invention eliminates the risk of damage to fiber optic sensing cable or cause the fiber optic sensing cable to become detached from the and pipe, when a pipeline assembly is being installed in a horizontal bore. It will be understood that the present invention may use all or some of the steps of the known drilling and installation method illustrated in FIG. 2; however in the present invention additional steps are performed which mitigate the afore-mentioned problems.

The present invention involves providing a mechanically strong (heavy duty) conduit which has a smaller diameter compared with the diameter of the pipeline, which is attached to an outer-surface of the pipeline. The fiber optic sensing cable is threaded through the conduit. Preferably the conduit has an inner diameter which is 2-5 times the diameter of the fiber optic sensing cable.

Figure 4:
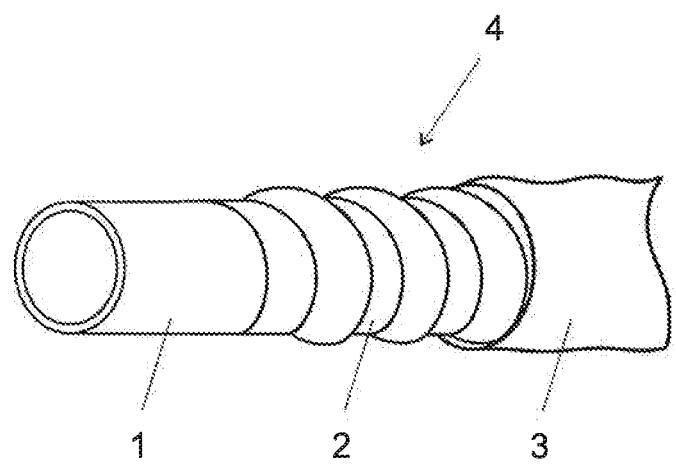
FIG. 4 provides a perspective view of a conduit used in the present invention.

FIG. 4 provides a perspective view of the conduit 4. In the particular example shown in FIG. 4 the conduit 4 is shown to be a laminate structure. The conduit comprises three layers: a first inner layer 1 which comprises for instance a polymer layer with for instance a aramid or glass fibre of carbon fibre or alike reinforcement, a second intermediate metallic layer 2 which provides structure support for the conduit and a third outer layer 3 which comprises polymer. Preferably the polymer is polyethylene (PE). Typically a corrosion-protective coat is provided on a pipe of a pipeline; the corrosion-protective coat typically comprises PE. The polyethylene outer layer 3 provided on the conduit 4 will prevent the conduit 4 from damaging the corrosion protective coat which is on the pipe, when the conduit 4 is attached to the outer-surface of the pipe.

Figure 5:
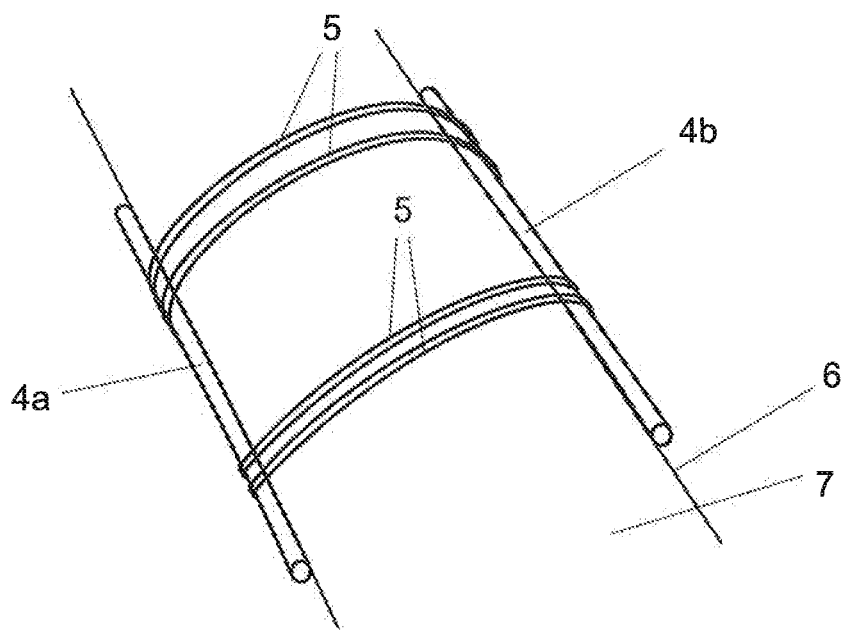
FIG. 5 provides a perspective view of how the conduits are attached to an outer-surface of the pipe.

As shown in FIG. 5 attachment of the conduit 4 to the pipe can be at achieved using straps 5. FIG. 5 shows only a portion of a length of two conduits 4 each attached to an outer surface 6 of a pipe 7. The straps 5 preferably comprise polymer such as polyethylene (PE). It will be understood that any suitable attachment means can be used other than straps, for example, tape or bands may be used to attach the conduit to the outer-surface of the pipeline.

The straps 5 are heavy duty non-metallic. These straps can hold the conduits 4 in place but also resist and endure the stress of the HDD pull back rubbing against the bore hole walls. Straps 5 used for HDD sections can preferably withstand a pulling tension of typically 1000 lbs.

Figure 6:
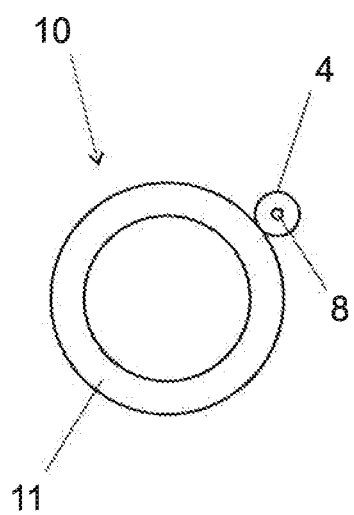
FIG. 6 provides a cross-sectional view of a pipeline assembly according to an embodiment of the present invention, in which a conduit is attached to a pipe.

When the conduit 4 is attached to the pipe a pipeline assembly is formed. The pipeline assembly 10 is shown in FIG. 6. The pipeline assembly 10 which comprise a conduit 4 is attached to an outer-surface 6 of a pipe 11. As illustrated in FIG. 6 a pulling line 8 is provided inside the conduit 4 before the pipeline assembly 10 is moved into a bore hole. The pulling line 8 extends within the conduit 4, along the length of the conduit 4. One end of the pulling line 8 is then connected to a fiber optic sensing cable. It will be understood that the pulling line 8 may be directly or indirectly connected to the fiber optic sensing cable. For example the pulling line 8 may be indirectly connected to the fiber optic sensing cable by means of an attachment head which is provided at an end of the pulling line.

Either before, or after, the pipeline assembly 10 has been moved into a bore hole, the pulling line 8 is retracted from conduit 4. Since the pulling line 8 is connected to the fiber optic sensing cable, as the pulling line 8 is retracted from the conduit the fiber optic sensing cable is pulled through the conduit 4.

It will be understood that if the pulling line 8 is retracted from conduit 4 after the pipeline assembly 10 has been moved into a bore hole then the pipeline assembly 10 will be moved into the bore hole with the pulling line 8 still extending within the conduit 4, along the length of the conduit 4. Alternatively, if the pulling line 8 is retracted from conduit before the pipeline assembly 10 is moved into a bore hole, then the fiber optic sensing cable will extend within the conduit 4, along the length of the conduit 4, before the pipeline assembly is moved into the bore hole.

Alternatively the fiber optic sensing cable may be integral to, or preinstalled in, the conduit 4 before the conduit 4 is attached to the outer-surface of the pipe.

Figure 1:
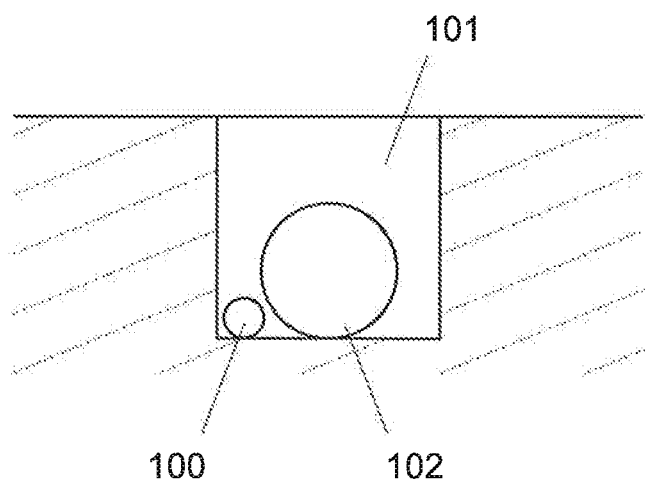
FIG. 1 shows a perspective view of a fibre optic sensing cable installed in the trench along the pipeline.
Figure 2:
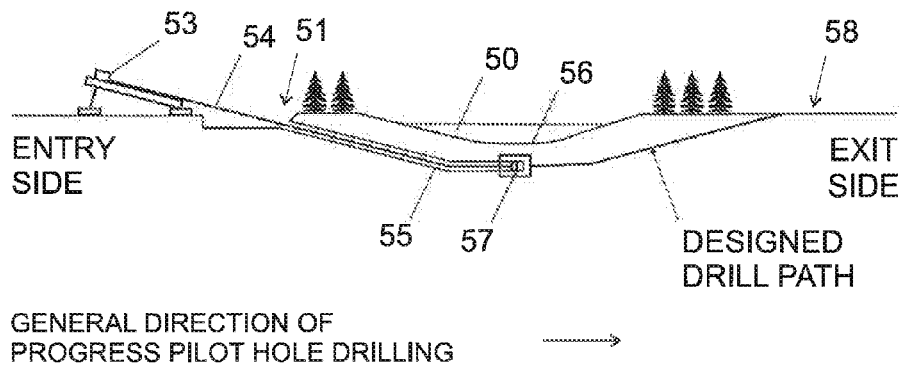
FIG. 2 illustrates the steps involved in drilling a horizontal bore and installing a pipeline in the drilled horizontal bore hole.
Figure 2:
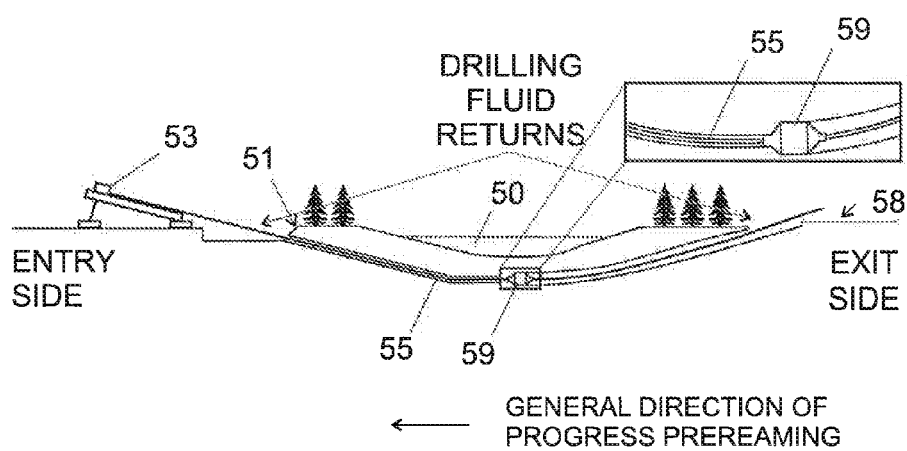
Figure 2:
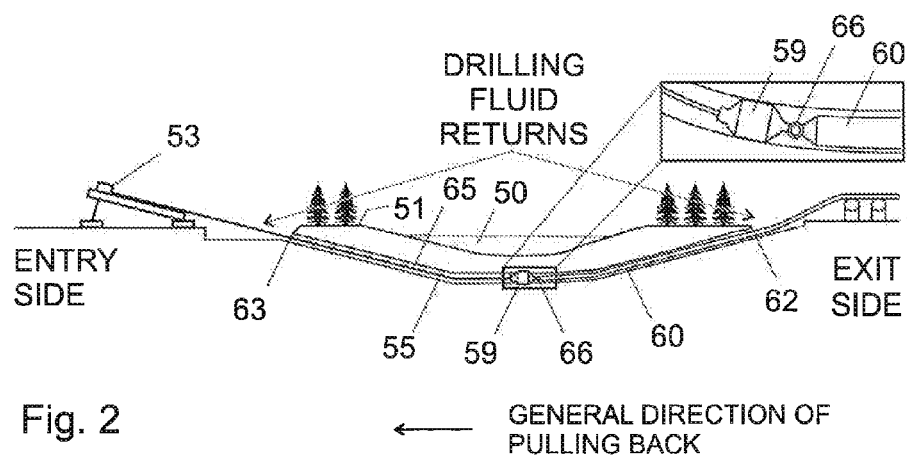
Figure 3:
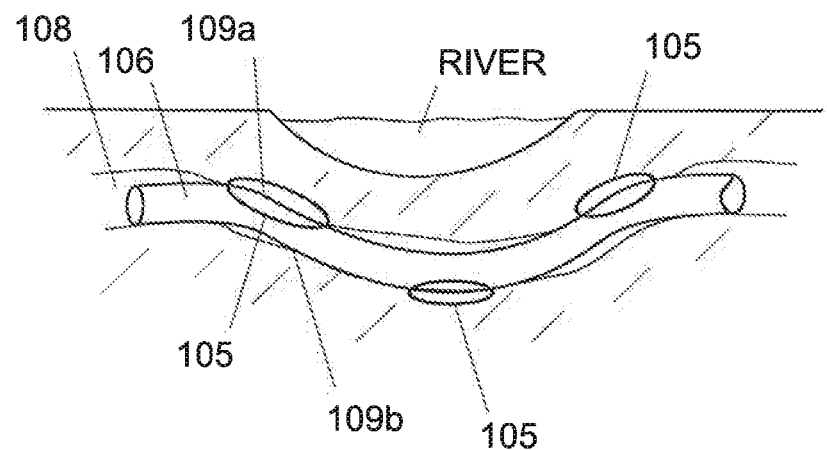
FIG. 3 illustrates the problems associated with current methods of installing pipelines which have fiber optic cable sensors attached thereto, in horizontal bore holes.

To move the pipeline assembly 10 into the bore hole the pipeline assembly 10 is pulled into the bore hole using a pulling line (in a similar fashion to that illustrated in FIG. 2). A pulling line is extended along the bore hole from a first end of the bore hole. Once the pulling line reaches the second, opposite end of the bore hole, it is attached to the pipeline assembly 10. The pulling line is then retracted from the bore hole so that the pipeline assembly 10 is pulled into the bore hole, until the pipeline assembly 10 extends along the length of the bore hole.

The pulling line may be directly or indirectly attached to the pipeline assembly 10. Preferably the pulling line is indirectly attached to the pipeline assembly using an attachment head which is fastened to the end of the pulling line and which has a socket to receive the pipe of the pipeline assembly and one or more tracks each of which receive a conduit. A protective cover provided on the attachment head may protect the tracks and the portions of the conduits which are received in the tracks. The attachment head will be discussed in more detail later.

FIG. 6 also illustrates the preferred positioning for the conduit 4 on the outer-surface 6 of the pipe 11. The conduit 4 is preferably attached at a side of the pipe 11. This will reduce the instances which the conduit 4 will rub against the walls of the bore hole when the pipeline assembly 10 is being installed. Preferably the conduit 4 is attached at any position between 1 o'clock-5 o'clock positions and 7 o'clock-11 o'clock positions along the circumference of the pipe 11; and most preferably the conduit 4 is attached to an outer-surface 6 of a pipe at a 10 o'clock position along the circumference of the pipe 11 or at a 2 o'clock position along the circumference of the pipe 11. However, it should be understood that the conduit 4 could be placed at any position around the circumference of the pipe 11. The conduit 4 may comprise a cable 8 or a pulling line 8 located within the conduit 4 so that the conduit 4 protects that cable 8 or a pulling line 8.

Figure 7:
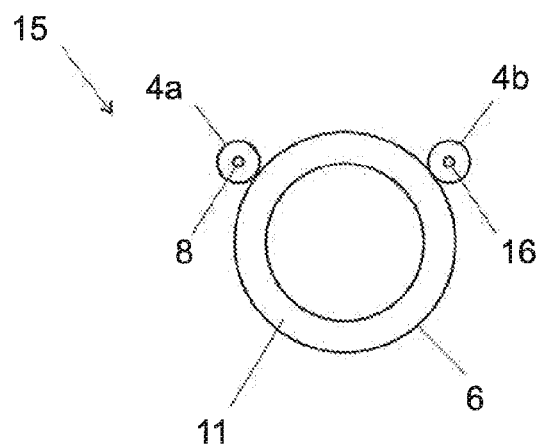
FIG. 7 provides a cross-sectional view of a pipeline assembly according to an embodiment of the present invention, in which two conduits are attached to a pipe.

FIG. 7 shows a pipeline assembly 15 according to further embodiment of the present invention. The pipeline assembly 15 has many of the same features as the pipeline assembly 10 shown in FIG. 6 and like features are awarded the same reference numbers. As shown in FIG. 7 a first and second conduit 4a,4b, are attached to an outer surface of the pipeline. Preferably the first and second conduits 4a,4b will be attached at an opposite sides of the pipe 11, as shown in 7. In the example shown in FIG. 7 the first conduit 4a is attached to an outer-surface 6 of a pipe at a 10 o'clock position along the circumference of the pipe 11 and the second conduit 4b is attached to an outer-surface 6 of a pipe at a 2 o'clock position along the circumference of the pipe 11. Advantageously this positioning of the first and second conduits 4a,4b will reduce the instances in which the conduits 4a,4b rub the walls of bore hole (in particular the roof or top of the bore hole) as the pipeline assembly 15 is moved into the bore hole, whilst not interfering with roller cradles suspended by the side-booms (the pipeline suspension mechanism during pulling).

In the pipeline assembly 15 the first conduit 4a comprises a pulling line 8 which extends within the first conduit 4a, along the length of the first conduit 4a, and an end of the pulling line 8 is attached to a first fiber optic sensing cable. The second conduit 4b comprises a second fiber optic sensing cable 16 which extends within the second conduit 4b, along the length of the second conduit 4b. The second fiber optic sensing cable 16 may have been provided in the second conduit 4b using a pulling line as described above, or alternatively the second fiber optic sensing cable 16 maybe pre-installed or integral to the second conduit 4b. Importantly in this example the second fiber optic sensing cable 16 is provided in the second conduit before the pipeline assembly 15 is moved into a bore hole while the first fiber optic sensing cable is not provided in the first conduit 4a before the pipeline assembly 15 is moved into a bore hole. The first fiber optic sensing cable is, optionally, pulled into the first conduit 4a by retracting the pulling line, only after the pipeline assembly 15 is moved into a bore hole. Providing a first conduit 4a with a pulling line 8 which connects to a first optical fiber and a second fiber optic sensing cable 16 in the second conduit will minimize critical installation failure. Specifically, if as pipeline assembly 15 is being moved into a bore hole the second conduit 4a and thus the second fiber optic sensing cable 16 becomes damaged, after the pipeline assembly 15 has been moved in to the bore hole the pulling line 8 can be retracted to the first conduit 4a to pull the first fiber optic sensing cable into the first conduit, until the first fiber optic sensing cable extends within the first conduit 4a, along the whole length of the first conduit 4a. Accordingly, in the case where second fiber optic sensing cable 16 becomes damaged when moving the pipeline assembly 15 into a horizontal bore hole, the pipeline assembly 15 does not need to be removed from the bore hole in order to provide an undamaged sensing fiber optic sensing cable in the pipeline assembly 15. In any case the provision of two conduits 4a,b and two fiber optic sensing cables provides a more robust and reliable pipelines assembly 15.

As discussed to move any of the pipe assemblies 10,15 mentioned above, into the bore hole, a pulling line is used.

Figure 8:
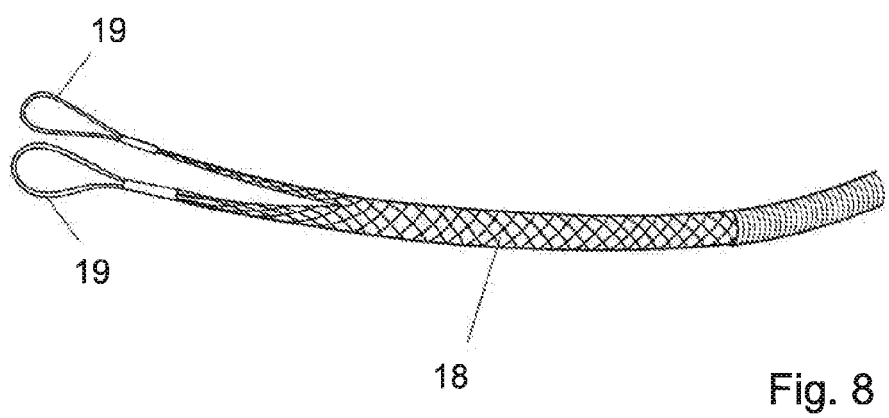
FIG. 8 provides a perspective view of a pulling line.

A part of a pulling line 18 is shown in FIG. 8; specifically an end part of the pulling line is shown. It is evident from FIG. 8 that the end of the pulling line 18 comprises loops 19. The loops will facilitate the attachment of the pulling line 18 directly to a pipeline assembly 10,15 or to an attachment head (which will be described later).

To move any of the pipe assemblies 10,15 mentioned above, into the bore hole, the pulling line 18 is first extended along the bore hole from a first end of the bore hole. Once the pulling line 18 reaches the second, opposite end of the bore hole, it is attached to the pipeline assembly 10,15. The pulling line 18 is then retracted from the bore hole so that the pipeline assembly 10,15 is pulled into the bore hole, until the pipeline assembly 10,15 extends along the length of the bore hole. The pulling line 18 may be directly or indirectly attached to the pipeline assembly 10,15. Preferably, the pulling line is indirectly attached to the pipeline assembly using an attachment head which is fastened to the end of the pulling line using the loops 19. An example of the attachment head is illustrated in FIG. 9.

Figure 9:
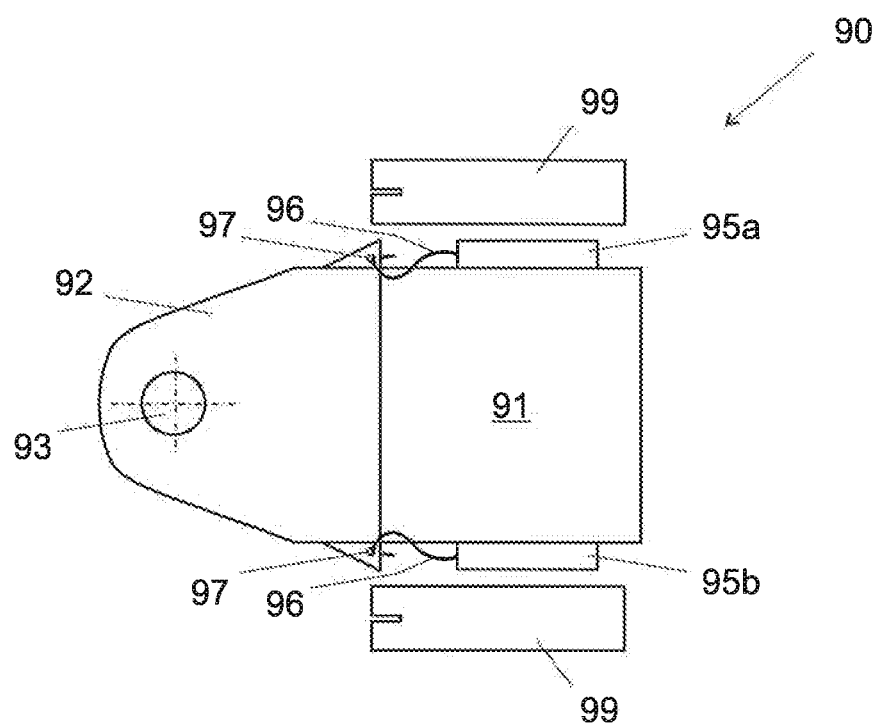
FIG. 9 provides a perspective view of an attachment head.

The attachment head 90 shown in FIG. 9 comprises a primary cylindrical member 91 which defines a socket suitable for receiving a portion of a pipe 11 of a pipeline assembly 10,15. A member 92 extends from the primary cylindrical member 91; a hole 93 is defined within the member 92 which allows a pulling line 18 to be fastened to the attachment head using loops 19 provided at the end of the pulling line 18.

The attachment head 90 further comprises one or more tracks each of which are suitable for receiving a portion of a conduit of a pipeline assembly. In this particular example the attachment head 90 comprises a first and second tracks which are defined respectively by and second subsidiary cylindrical members 95a,b. The diameter of each of the subsidiary cylindrical members 95a,b is slightly larger than the diameter of the conduits which are provided on the pipeline assembly so that the conduits can be received into the subsidiary cylindrical members 95a,b.

The attachment head 90 further comprises a mean for connecting conduits which have been received into the subsidiary cylindrical members 95a,b, to the attachment head. In the particular example shown in FIG. 9 hook members 96 are used to connect a conduits which are located in the first and second subsidiary cylindrical members 95a,b to the attachment head. Each hook member comprises a hook at opposite ends. Each hook member is hooked into a hole (not shown) which is provided in portion of the conduit which is located in a subsidiary cylindrical member 95a,b, and the opposite end of the hook member is hooked into a hole 97 which is defined in the attachment head adjacent a corresponding subsidiary cylindrical member 95a,b. The hook members 96 will ensure that each conduit remains attached to the attachment head 90 as the pulling line 18 is retracted from the bore hole. It will be understood that any other suitable attachment means may be used.

The attachment head 90 further comprises a protective cover 99 which extends over the first and second subsidiary cylindrical members 95a,b which define the first and second tracks, thus protecting the subsidiary cylindrical members 95a,b, and conduits which are received therein, from becoming damaged as the pipeline assembly 10,5 is moved into the bore hole. In this example the protective cover 99 also extends slightly over the hook members 96 and the holes 97 in attachment head 90 into which the hook members 96 hook. The protective cover 99 in this case will reduce the amount of dirt reaching the hook members 96 and the holes 97. The protective cover 99 will also provide protection for the subsidiary cylindrical members 95a,b and the parts of the conduits which are contained in the subsidiary cylindrical members 95a,b. The protective cover 99 may also serve to maintain a gap between the pipeline assembly and walls of a bore hole as the pipeline assembly is moved into the bore hole. Advantageously the attachment 90 head eases the pipeline pulling process and minimize risk of a conduit becoming damaged as the pipeline assembly is moved into the bore hole.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method for installing a fiber optic sensing cable along a pipeline, comprising steps of:
    attaching one or more conduits to an outer-surface of a pipe to form a pipeline assembly;
    attaching the pipeline assembly to an attachment head which is provided at an end of a pulling line, wherein the attachment head comprises a cylindrical member and one or more tracks;
    moving the pipeline assembly into a bore hole; and
    moving the fiber optic sensing cable into one or more of the conduits after the pipeline assembly has been moved into the bore hole or before the pipeline assembly has been moved into the bore hole,
    wherein the step of attaching the pipeline assembly to the attachment head comprises:
        (a) positioning a portion of the pipe into the cylindrical member of the attachment head, and, securing the pipe to the attachment head; and
        (b) positioning a portion of each of the one or more conduits into respective one or more of the tracks which are provided on the attachment head, so each said portion of the conduits is completely contained within the one or more tracks so that the tracks protect each said portion of the conduits.

2. The method according to claim 1 wherein the bore hole is a substantially horizontal bore hole.

3. The method of claim 1 wherein the step of moving an fiber optic sensing cable into a conduit comprises steps of providing a pulling line in the conduit so that it extends within the conduit, along the length of the conduit; connecting an end of the pulling line to a fiber optic sensing cable; retracting the pulling line from the conduit so that the fiber optic sensing cable is pulled through the conduit.

4. The method of claim 1 wherein the step of attaching one or more conduits to the outer-surface of the pipe comprises strapping one or more conduits to the outer-surface of the pipe using polymer straps.

5. The method of claim 1 wherein the step of attaching one or more conduits to the outer-surface of the pipe comprises attaching a conduit at any position between 1 o'clock - 5 o'clock positions and 7 o'clock -11 o'clock positions along the circumference of the pipe.

6. The method of claim 1 wherein the method comprises steps of attaching a first and a second conduits to the pipe, wherein the first conduit comprises a pulling line which extends within the first conduit, along the length of the first conduit, and an end of the pulling line is attached to a first fiber optic sensing cable; and
    the second conduit comprises a second fiber optic sensing cable which extends within the second conduit, along the length of the second conduit.

7. The method of claim 1 wherein the step of moving the pipeline assembly into the bore hole comprises a step of pulling the pipeline assembly through the bore hole using the pulling line and a protective cover which are provided on the attachment head preventing the tracks from contacting walls of the bore hole.

8. A pipeline assembly comprising,
a pipe which is suitable for occupying a horizontal drilled section;
one or more conduits attached to an outer-surface of the pipe, wherein each of the one or more conduits is suitable for receiving a fiber optical sensing cable,
an attachment head provided at an end of a pulling line, wherein the attachment head comprises:
a cylindrical member into which a portion of the pipe is positioned; and,
one or more tracks which completely contain a portion of said one or more conduits respectively, so that the one or more tracks protect said respective portions of the conduits.

9. The pipeline assembly according to claim 8 wherein the one or more conduits are attached to the outer-surface of the pipe at any position between 1 o'clock -5o'clock positions and/or 7 o'clock -11 o'clock positions along the circumference of the pipe.

10. The pipeline assembly according to claim 8 wherein one of the one or more conduits is attached to the outer-surface of the pipe at a 10 o'clock position along the circumference of the pipe or at a 2 o'clock position along the circumference of the pipe.

11. The pipeline assembly according to claim 8 wherein the pipeline assembly comprises a first and a second conduits, wherein the first conduit comprises a first fiber optic sensing cable and a first reinforcement cable, both of which extend within the first conduit, along the length of the first conduit, and the second conduit comprises a second fiber optic sensing cable and a second reinforcement cable, both of which extend within the second conduit, along the length of the second conduit.

12. The pipeline assembly according claim 8 wherein at least one of the one or more conduits comprises a polymer coating.

13. The attachment head according to claim 8, wherein a portion of fiber optic sensing cable is contained within each conduit.

14. The attachment head according to claim 13 wherein the attachment head further comprises a means for connecting at least one of the one or more conduits to the attachment head.

15. The attachment head according to claim 13 further comprising a cover which is arranged to extend over the one or more tracks.

* * * * *